(12) United States Patent
Ginjpalli et al.

(10) Patent No.: US 7,197,051 B1
(45) Date of Patent: Mar. 27, 2007

(54) SYSTEM AND METHOD FOR EFFICIENT PACKETIZATION OF ATM CELLS TRANSMITTED OVER A PACKET NETWORK

(75) Inventors: Hariprasad Ginjpalli, Cupertino, CA (US); Jayakumar Jayakumar, San Jose, CA (US); Durai Chinnaiah, San Jose, CA (US); Kent Wayne Wendorf, San Jose, CA (US); James Ding, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1034 days.

(21) Appl. No.: 09/974,462

(22) Filed: Oct. 9, 2001

(51) Int. Cl.
*H04J 3/24* (2006.01)
(52) U.S. Cl. ..................................... 370/474
(58) Field of Classification Search ................ 370/473, 370/474
See application file for complete search history.

(56) References Cited

U.S. PATENT DOCUMENTS

| | | | | |
|---|---|---|---|---|
| 5,896,380 A * | 4/1999 | Brown et al. | ................ | 370/388 |
| 5,938,749 A * | 8/1999 | Rusu et al. | ................... | 370/412 |
| 6,005,868 A * | 12/1999 | Ito | ............................. | 370/413 |
| 6,021,129 A * | 2/2000 | Martin et al. | ............... | 370/466 |
| 6,151,318 A * | 11/2000 | Woodward et al. | ......... | 370/474 |
| 6,233,243 B1* | 5/2001 | Ganmukhi et al. | ......... | 370/412 |
| 6,590,897 B1* | 7/2003 | Lauffenburger et al. | . | 370/395.6 |
| 6,687,225 B1* | 2/2004 | Kawarai et al. | ......... | 370/230.1 |
| 6,700,873 B1* | 3/2004 | Sugaya et al. | ........... | 370/241.1 |
| 6,791,985 B1* | 9/2004 | Ashwood-Smith et al. | ....................... | 370/395.5 |
| 6,804,198 B1* | 10/2004 | Iwamoto | ..................... | 370/235 |
| 6,829,224 B1* | 12/2004 | Goldman et al. | ...... | 370/395.21 |
| 6,920,134 B2* | 7/2005 | Hameleers et al. | ......... | 370/389 |
| 7,013,318 B2* | 3/2006 | Rosengard et al. | ...... | 370/395.1 |
| 2003/0058880 A1* | 3/2003 | Sarkinen et al. | ............ | 370/413 |

* cited by examiner

*Primary Examiner*—Doris H. To
*Assistant Examiner*—Phuongchau Ba Nguyen
(74) *Attorney, Agent, or Firm*—Blakely, Sokoloff, Taylor & Zafman LLP

(57) ABSTRACT

A system and method for efficient packetization of cells transmitted over a packet network are described. Multiple virtual connections are received, each virtual connection carrying multiple cells. One or more cells of the cells carried by each virtual connection are stored for a predetermined time period. A cell counter of the stored cells is modified to indicate a number of the stored cells. Finally, a packet containing the stored cells is formed, the packet to be transmitted to a destination node over a network.

36 Claims, 5 Drawing Sheets

SYSTEM AND METHOD FOR EFFICIENT PACKETIZATION OF ATM CELLS TRANSMITTED OVER A PACKET NETWORK

FIELD OF THE INVENTION

The present invention relates generally to data communications and, more particularly, to a system and method for efficient packetization of ATM cells transmitted over a packet network.

BACKGROUND OF THE INVENTION

Asynchronous Transfer Mode (ATM) or "cell switching" is a method of transmitting digital information wherein the information is broken into equal sized units called "cells." The individual cells of information are transmitted from a source node to a destination node through a "connection". A connection is a pathway through a digital network. A digital network is constructed of digital switches coupled together by digital communication links.

Each cell originates at a source node and is transmitted across the communication links. The communication links carry the cells of information between the digital switches along the connection pathway. The digital switches route the cells from incoming communication links to outgoing communication links and finally to a destination node.

Each digital switch can be connected to several communication links. Furthermore, each communication link can carry several different connections simultaneously. Typically, a cell memory or buffer is used for temporarily holding cells prior to transmission on a communication link. The cell memory is arranged into logical queues or class of service buffers (COSB). Several queues may be used for separating different types of services and connections. For example, cells belonging to higher priority connections may be stored in queues that have a higher priority of service. In some cases, a separate queue may be assigned to each connection. Servicing a queue entails removing a cell from the queue and sending the cell out on a communication link or to a destination node coupled to the digital switch. A service algorithm is employed to select a queue for service. To fully utilize the bandwidth of a communication link, a cell should be selected for service during each service time, where a service time is equal to the time required to transmit a cell on the communication link.

Typically, switches are capable of handling different classes of cell traffic, each class having different characteristics and different service requirements. The various classes of cell traffic might include high priority traffic, voice, high-speed deterministic traffic, bursty data, etc. Typically, each of these traffic types is buffered at each switch in accordance with its particular sensitivities to network delay and cell loss. Cell loss may occur due to intermittent short-term overload of network bandwidth and lack of adequate buffer capacity. Each class of traffic may be placed in a preassigned queue at each switch, each queue having a different service priority. Servicing algorithms are typically employed to discriminate between traffic classes in order to allocate bandwidth. Delay is managed by properly sizing the queue depths and prioritizing transmission within a class.

After cells are serviced and removed from a respective queue or COSB, in order to transfer the cells to a destination node over a non-ATM packet network, for example a MultiProtocol Label Switching (MPLS) network, multiple cells belonging to different connections need to be encapsulated in a single packet. When packets enter the MPLS-based network, label edge routers (LER) within the network assign a label to each packet. This label or identifier is attached to the packet formed from the ATM cells and contains information based on a routing table entry, such as destination, bandwidth, delay, and other metrics. This label is referred to as the tunnel label. Within the tunnel, there can be multiple data flows, each of which is identified by a virtual circuit (VC) label. Each VC label represents an aggregate flow of ATM connections. Each of the VC labels is mapped to a COSB. Multiple ATM connections belonging to the same class of service are bundled into one VC label. Since the entire cell is carried with the MPLS label stack within the corresponding packet, additional overhead is added within the network. In order to reduce the per cell overhead, multiple cells need to be encapsulated within the packet without exceeding the delay and jitter characteristics for the respective connection.

SUMMARY OF THE INVENTION

A system and method for efficient packetization of cells transmitted over a packet network are described. Multiple virtual connections are received, each virtual connection carrying multiple cells. One or more cells of the cells carried by each virtual connection are stored for a predetermined time period. A cell counter of the stored cells is modified to indicate a number of the stored cells. Finally, a packet containing the stored cells is formed, the packet to be transmitted to a destination node over a network.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

According to embodiments described herein, a system and method for efficient packetization of cells transmitted over a packet network are described. Multiple virtual connections are received, each virtual connection carrying multiple cells. One or more cells belonging to one or more virtual connection are stored for a predetermined time period. Multiple virtual circuits belonging to the same class of service are assigned a virtual circuit (VC) label at the time of the packetization. Each VC label will be mapped to a class of service buffer (COSB) queue. Each of the COSB queues have a preconfigured maximum number of cells per packet and a maximum wait time to accumulate the cells for prioritization. The packet is formed out of these cells when a counter reaches a configured maximum number of cells or a timer counting the wait time has expired. An intended advantage of the embodiments described herein is to reduce the overhead within the network without exceeding the delay and jitter characteristics for the respective connection. Another intended advantage is to provide increased efficiency at the time of cell packetization.

In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
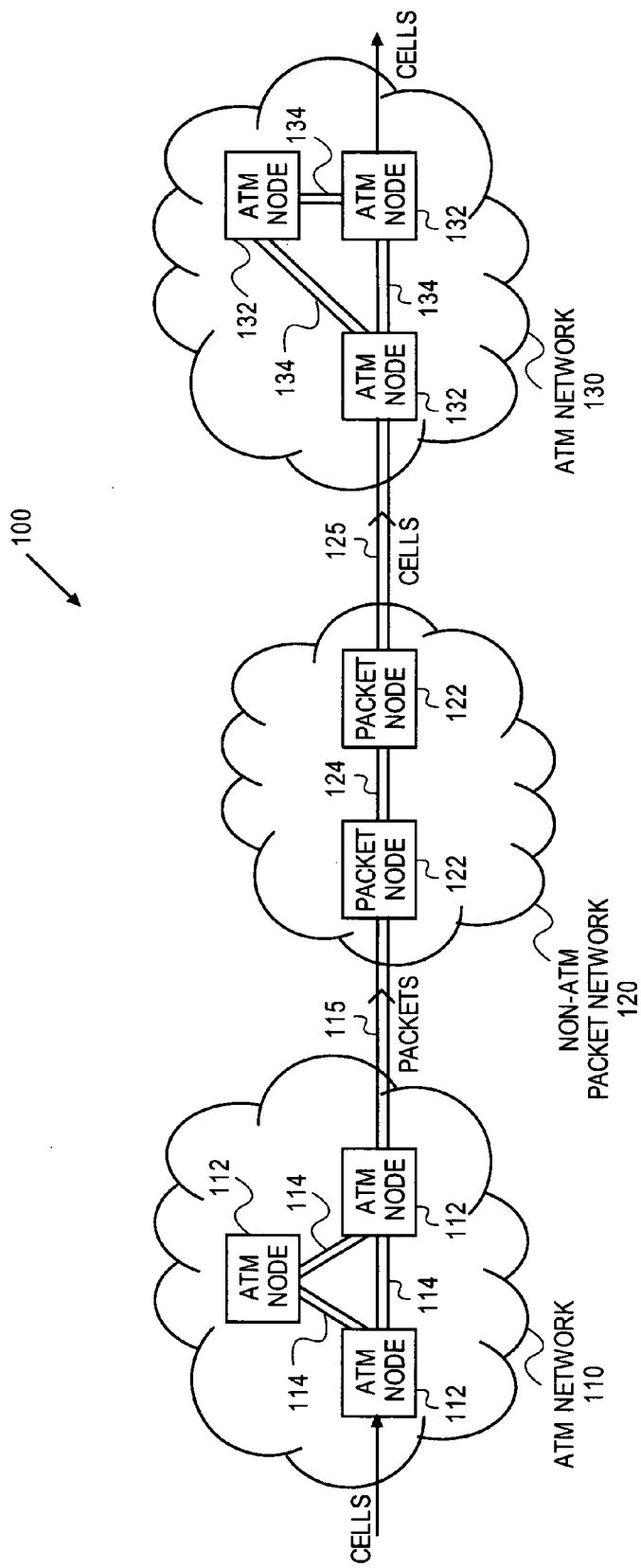
FIG. 1 is a block diagram of one embodiment of a network structure.

FIG. 1 is a block diagram of one embodiment of a network structure. As illustrated in FIG. 1, the network structure 100 includes three networks 110, 120, and 130 interconnected via one or more communication links 115 and 125. For example, network 120, such as a MultiProtocol Label Switching (MPLS) network, is connected to the network 110, such as an Asynchronous Transfer Mode (ATM) network, via communication links 115 and to the network 130, for example a second ATM network, via communication links 125. Each ATM network 110 and 130 includes multiple ATM network nodes 112, 132, interconnected via communication links 114 and 134, respectively. The packet network 120 contains multiple packet nodes 122 coupled through communication links 124. Packet nodes 122 are also coupled to ATM nodes 112 within network 110 via communication links 115 and to ATM nodes 132 within network 130 via corresponding communication links 125.

In one embodiment, cells carried on multiple virtual connections and transmitted from a source node (not shown) arrive at a node 112 within the network 110 and travel across the communication links 114 through various network nodes 112 within the network 110. The cells are subsequently encapsulated in packets and transmitted across the communication links 115 to the packet network 120. After being transmitted across the communication links 124 through multiple packet nodes 122 within the network 120, individual cells within the formed packets are transmitted across the communication links 125 to network nodes 132 within the network 130 and further to a destination node (not shown).

Figure 2:
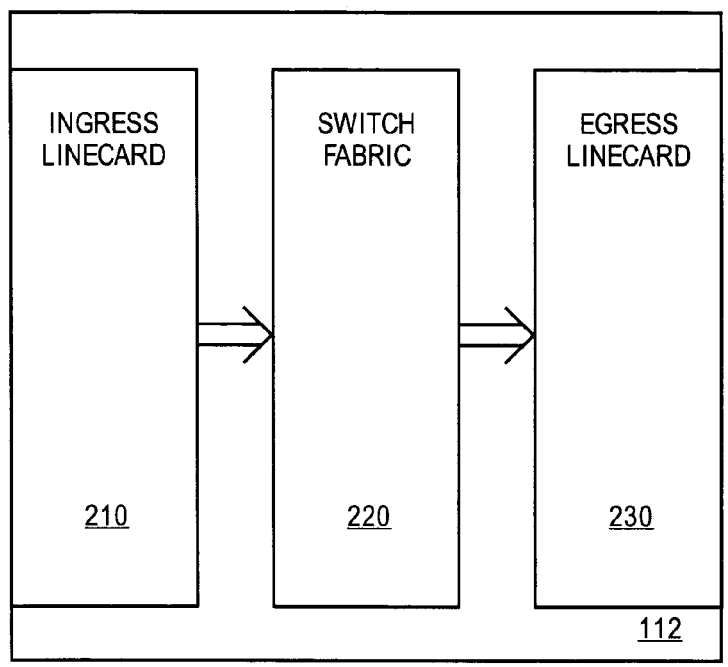
FIG. 2 is a block diagram of one embodiment of a network node within the network structure.

FIG. 2 is a block diagram of one embodiment of a network node 112 within the network structure 100. As illustrated in FIG. 2, the network node 112 includes an ingress linecard 210 to receive the cells transmitted across one or more communication links 114, a switch fabric 220 coupled to the ingress linecard 210 to switch the cells to an outgoing communication link 115, and an egress linecard 230 coupled to the switch fabric 220 to collect and encapsulate the cells into packets to be transmitted along the communication link 115. The egress linecard 230 will be described in further detail below in connection with FIG. 3.

Figure 3:
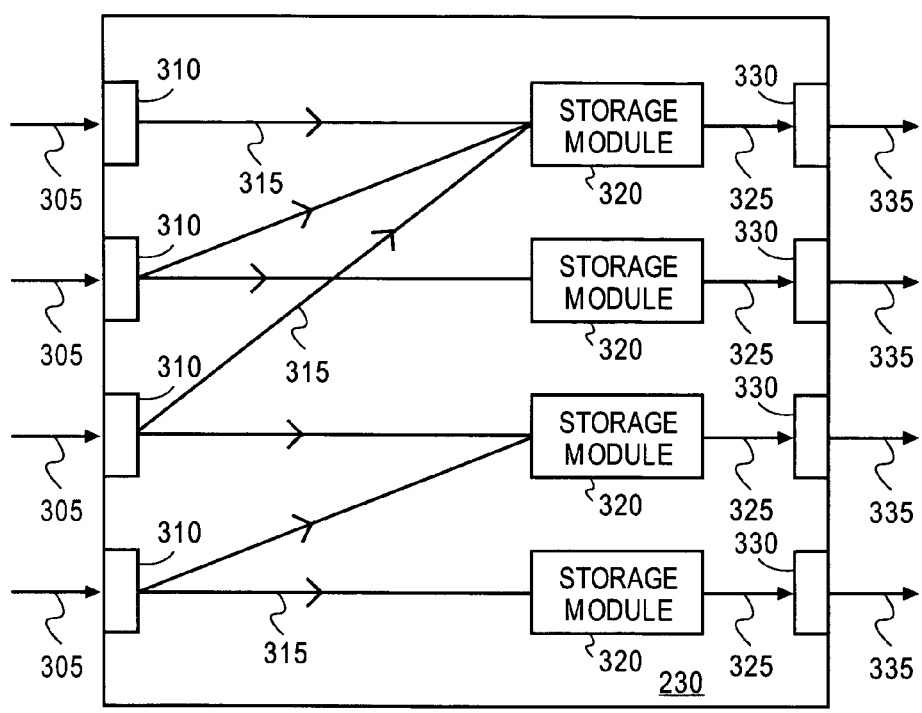
FIG. 3 is a block diagram of one embodiment of a linecard within the network node.

FIG. 3 is a block diagram of one embodiment of a linecard 230 within the network node 112. As illustrated in FIG. 3, the linecard 230 includes multiple input ports 310 configured to receive the cells from different virtual connections transmitted from the switch fabric 220 shown in FIG. 2. Each cell is subsequently directed to one of multiple storage modules 320 within the linecard 230 via internal links 315. Each storage module 320 encapsulates the stored cells into packets to be transmitted to corresponding output ports 330 via internal links 325. The output ports 330 further transmit the packets to a network node 122 within network 120 via communication links 335. The storage modules 320 will be described in further detail below in connection with FIG. 4.

Figure 4:
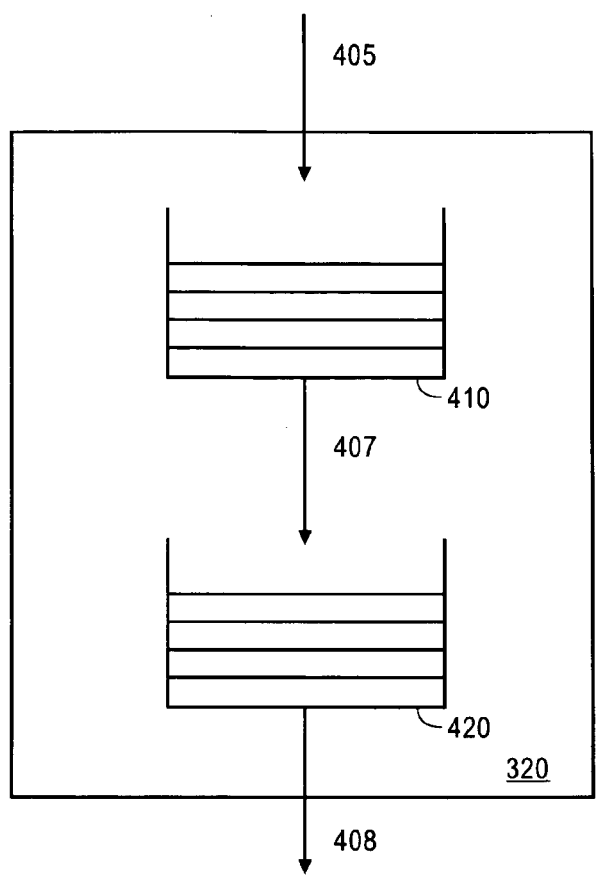
FIG. 4 is a block diagram of one embodiment of a storage module within the linecard.

FIG. 4 is a block diagram of one embodiment of a storage module 320 within the linecard 230. As illustrated in FIG. 4, each storage module 320 includes a timing buffer 410 to receive and store cells 405 and a class of service buffer (COSB) 420 coupled to the timing buffer 410 to receive cells 407 from the timing buffer 410. In one embodiment, the COSB 420 receives the cells 407 at predetermined periods of time. Each predetermined time period is selected based on an inter-cell gap parameter (ICG) and a cell delay variation tolerance parameter (CDVT) between two adjacent cells corresponding to a virtual connection having the highest speed among all virtual connections sent to the respective COSB 420.

Figure 5:
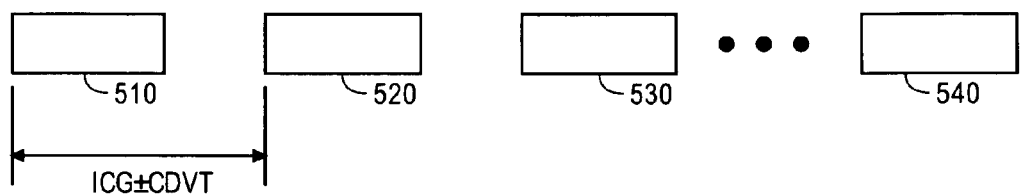
FIG. 5 is a block diagram of a conventional flow of cells transmitted within the network structure.

FIG. 5 is a block diagram of a conventional flow of cells transmitted within the network structure. As illustrated in FIG. 5, in a flow of cells 510–540 carried by the fastest virtual connection, i.e. the virtual connection having the highest speed, each two adjacent cells are spaced apart at a predetermined time period equal to ICG±CDVT.

Referring back to FIG. 4, in one embodiment, the timing buffer 410 receives cells 405 carried by multiple virtual connections and stores the cells 405 for a predetermined period of time, for example a time period equal to ICG of the fastest virtual connection belonging to the same COSB. A cell counter (not shown) corresponding to the timing buffer 410 is incremented after each cell 405 is received and stored within the timing buffer 410. At the same time, a timer (not shown) counts the time elapsed and compares the time with the predetermined time period.

If the cell counter reaches a value equal to the size of a packet and the predetermined time period has not expired, the stored cells 407 are transmitted from the timing buffer 410 to the COSB 420. At the same time, the cell counter and the timer are reset. The COSB 420 subsequently encapsulates the cells into the packet and transmits the packet 408 at the next service selection.

Otherwise, if the predetermined time period of the timer expires, and the cell counter is still below the value of the packet size, the stored cells 405 are transmitted from the timing buffer 410 to the COSB 420 and the timer is reset. The COSB 420 further encapsulates the cells 407 into the packet and transmits the packet 408 at the next service selection.

Figure 6:
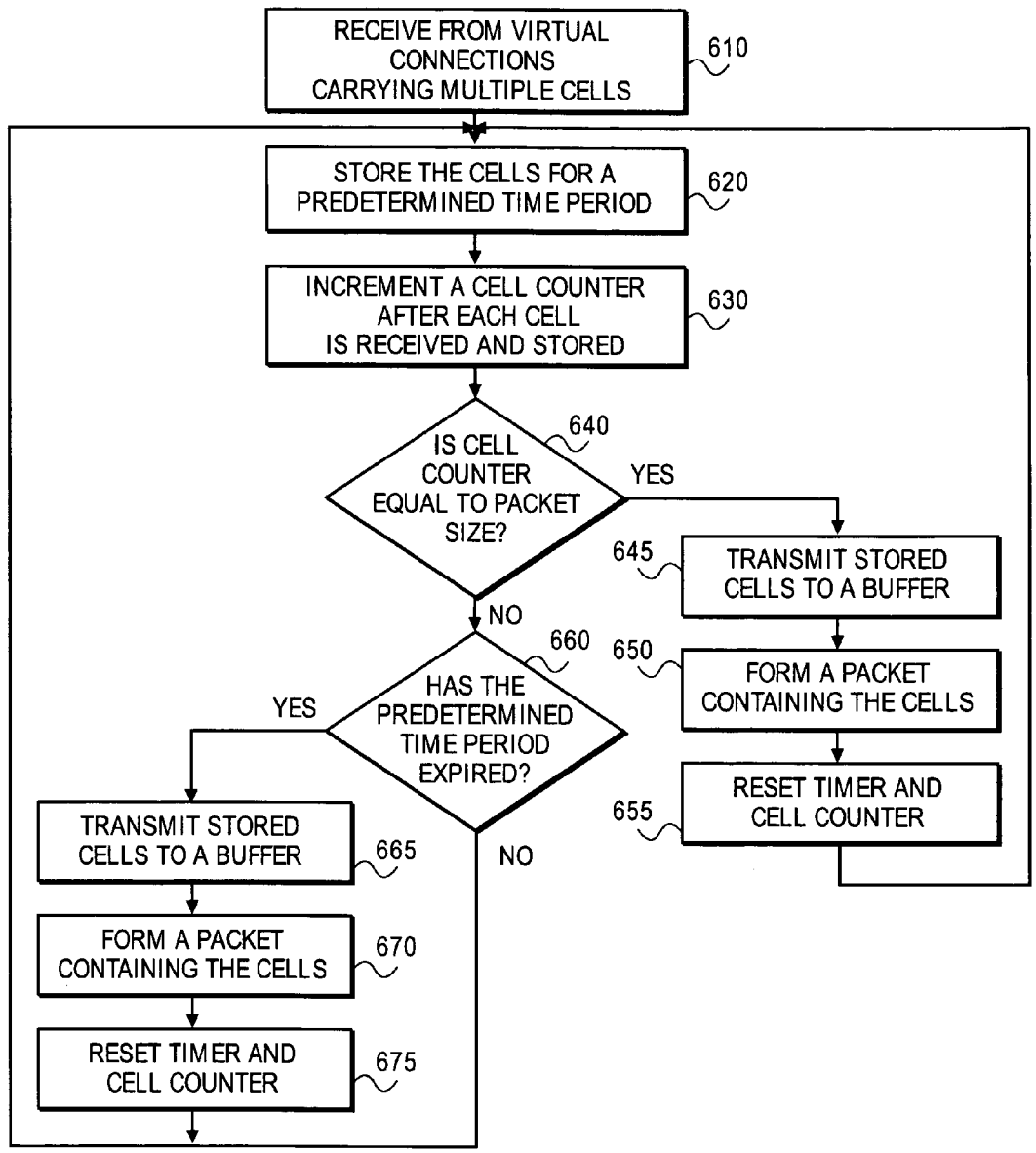
FIG. 6 is a flow diagram of one embodiment of a method for efficient packetization of cells.

FIG. 6 is a flow diagram of one embodiment of a method for efficient packetization of cells. As illustrated in FIG. 6, at processing block 610, virtual connections carrying multiple cells 405 are received in the timing buffer 410.

At processing block 620, the cells 405 are stored for a predetermined period of time. At processing block 630, a cell counter is incremented after each cell 405 is received and stored in the timing buffer 410.

At processing block 640, a decision is made whether the cell counter is equal to the size of a packet 408 to be formed with the stored cells. If the cell counter is equal to the packet size, at processing block 645, the stored cells 407 are transmitted from the timing buffer 410 to the COSB 420. Next, at processing block 650, a packet 408 containing the transmitted cells is formed by the COSB 420. At processing block 655, the cell counter and the timer of the timing buffer 410 are reset and blocks 620–640 are repeated.

Otherwise, if the cell counter is not equal to the packet size, at processing block 660, a decision is made whether the predetermined time period has expired. If the predetermined time period has expired, at processing block 665, the stored cells 407 are transmitted from the timing buffer 410 to the COSB 420. Next, at processing block 670, a packet 408 containing the transmitted cells is formed by the COSB 420. At processing block 675, the timer and the cell counter within the timing buffer 410 are reset and blocks 620–660 are repeated.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information. While embodiments of the present invention will be described with reference to the Internet and the World Wide Web, the system and method described herein is equally applicable to other network infrastructures or other data communication systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving from a plurality of virtual connections, each virtual connection of said plurality of virtual connections carrying a plurality of cells;
   storing at least one cell of said plurality of cells of said each virtual connection for a predetermined time period;
   modifying a cell counter to indicate a number of said at least one stored cell;
   transmitting said at least one cell to a buffer to form a packet, if said cell counter is equal to a predetermined size of said packet; and
   forming a packet containing said at least one cell, said packet to be transmitted to a destination node over a network.

2. The method according to claim 1, further comprising:
   transmitting said at least one cell to the buffer to form said packet, after expiration of said predetermined time period.

3. The method according to claim 2, further comprising:
   resetting said cell counter and a timer counting said predetermined time period after transmission of said at least one cell.

4. The method according to claim 1, wherein said buffer is a class of service buffer.

5. The method according to claim 1, wherein said network is an Internet Protocol (IP) packet network.

6. The method according to claim 1, wherein said network is a MultiProtocol Label Switching (MPLS) packet network.

7. The method according to claim 1, wherein said predetermined time period is substantially equal to a predetermined inter-cell gap (ICG) parameter between two adjacent cells of said plurality of cells carried by a highest speed virtual connection of said plurality of virtual connections.

8. The method according to claim 1, wherein said modifying further comprises:
   incrementing said cell counter after said at least one cell is received and stored.

9. The method according to claim 1 further comprising:
   resetting said cell counter and a timer counting said predetermined time period after transmission of said at least one cell.

10. A system comprising:
    means for receiving from a plurality of virtual connections, each virtual connection of said plurality of virtual connections carrying a plurality of cells;
    means for storing at least one cell of said plurality of cells of said each virtual connection for a predetermined time period;
    means for modifying a cell counter to indicate a number of said at least one stored cell;
    means for transmitting said at least one cell to a buffer to form a packet, if said cell counter is equal to a predetermined size of said packet; and
    means for forming said packet containing said at least one cell, said packet to be transmitted to a destination node over a network.

11. The system according to claim 10, further comprising:
    means for transmitting said at least one cell to the buffer to form said packet, after expiration of said predetermined time period.

12. The system according to claim 11, further comprising:
    means for resetting said cell counter and a timer counting said predetermined time period after transmission of said at least one cell.

13. The system according to claim 10, wherein said buffer is a class of service buffer.

14. The system according to claim 10, wherein said network is an Internet Protocol (IP) packet network.

15. The system according to claim 10, wherein said network is a MultiProtocol Label Switching (MPLS) packet network.

16. The system according to claim 10, wherein said predetermined time period is substantially equal to a predetermined inter-cell gap (ICG) parameter between two adjacent cells of said plurality of cells carried by a highest speed virtual connection of said plurality of virtual connections.

17. The system according to claim 10, further comprising:
    means for incrementing said cell counter after said at least one cell is received and stored.

18. The system according to claim 10, further comprising:
    means for resetting said cell counter and a timer counting said predetermined time period after transmission of said at least one cell.

19. A computer readable medium containing executable instructions, which, when executed in a processing system, cause said processing system to perform a method comprising:
    receiving from a plurality of virtual connections, each virtual connection of said plurality of virtual connections carrying a plurality of cells;
    storing at least one cell of said plurality of cells of said each virtual connection for a predetermined time period;

modifying a cell counter to indicate a number of said at least one stored cell;

transmitting said at least one cell to a buffer to form a packet, if said cell counter is equal to a predetermined size of said packet; and forming a packet containing said at least one cell, said packet to be transmitted to a destination node over a network.

20. The computer readable medium according to claim 19, wherein said method further comprises:

transmitting said at least one cell to the buffer to form said packet, after expiration of said predetermined time period if said cell counter is less than a predetermined size of the formed packet.

21. The computer readable medium according to claim 20, wherein said method further comprises:

resetting said cell counter and a timer counting said predetermined time period after transmission of said at least one cell.

22. The computer readable medium according to claim 19, wherein said buffer is a class of service buffer.

23. The computer readable medium according to claim 19, wherein said network is an Internet Protocol (IP) packet network.

24. The computer readable medium according to claim 19, wherein said network is a MultiProtocol Label Switching (MPLS) packet network.

25. The computer readable medium according to claim 19, wherein said predetermined time period is substantially equal to a predetermined inter-cell gap (ICG) parameter between two adjacent cells of said plurality of cells carried by a highest speed virtual connection of said plurality of virtual connections.

26. The computer readable medium according to claim 19, wherein said modifying further comprises:

incrementing said cell counter after said at least one cell is received and stored.

27. The computer readable medium according to claim 19, wherein said method further comprises:

resetting said cell counter and a timer counting said predetermined time period after transmission of said at least one cell.

28. An apparatus comprising:

a timing buffer to receive from a plurality of virtual connections, each virtual connection of said plurality of virtual connections carrying a plurality of cells, to store at least one cell of said plurality of cells of said each virtual connection for a predetermined time period, and to modify a cell counter to indicate a number of said at least one stored cell; and a service buffer coupled to said timing buffer to receive said at least one cell if said cell counter reaches a value equal to a predetermined size of a packet, to form a packet containing said at least one cell, said formed packet to be transmitted to a destination node over a network.

29. The apparatus according to claim 28, wherein said timing buffer is to transmit said at least one cell to said service buffer, after expiration of said predetermined time period if the cell counter has not reached said value.

30. The apparatus according to claim 29, wherein said timing buffer further resets said cell counter and a timer counting said predetermined time period after transmission of said at least one cell.

31. The apparatus according to claim 28, wherein said service buffer is a class of service buffer.

32. The apparatus according to claim 28, wherein said network is an Internet Protocol (IP) packet network.

33. The apparatus according to claim 28, wherein said network is a MultiProtocol Label Switching (MPLS) packet network.

34. The apparatus according to claim 28, wherein said predetermined time period is substantially equal to a predetermined inter-cell gap (ICG) parameter between two adjacent cells of said plurality of cells carried by a highest speed virtual connection of said plurality of virtual connections.

35. The apparatus of claim 28, wherein said timing buffer further increments said cell counter after said at least one cell is received and stored.

36. The apparatus according to claim 28, wherein said timing buffer further resets said cell counter and a timer counting said predetermined time period after transmission of said at least one cell.

* * * * *